(12) United States Patent
Singh

(10) Patent No.: US 11,669,626 B2
(45) Date of Patent: Jun. 6, 2023

(54) RESOURCE ACCESS WITH USE OF BLOOM FILTERS

(71) Applicant: Citrix Systems, Inc., Fort Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 259 days.

(21) Appl. No.: 17/205,241

(22) Filed: Mar. 18, 2021

(65) Prior Publication Data
US 2022/0300630 A1  Sep. 22, 2022

(51) Int. Cl.
*G06F 21/62*  (2013.01)

(52) U.S. Cl.
CPC ............... *G06F 21/6209* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 7,702,640 B1 | 4/2010 | Vermeulen | |
| 10,650,003 B1* | 5/2020 | Rubin | G06F 16/24573 |
| 2006/0294311 A1 | 12/2006 | Fu et al. | |
| 2007/0136331 A1* | 6/2007 | Hasan | G06F 16/9014 |
| 2008/0154852 A1 | 6/2008 | Beyer et al. | |
| 2008/0256094 A1 | 10/2008 | Gupta et al. | |
| 2009/0043993 A1* | 2/2009 | Ford | G06F 11/364 |
| | | | 712/216 |
| 2010/0094877 A1* | 4/2010 | Garbe | G06F 16/93 |
| | | | 707/E17.084 |
| 2011/0270852 A1 | 11/2011 | Watanabe | |
| 2012/0084459 A1 | 4/2012 | Wu | |
| 2013/0046979 A1 | 2/2013 | Karp | |
| 2013/0132408 A1 | 5/2013 | Little | |
| 2013/0166576 A1 | 6/2013 | Hudzia et al. | |
| 2013/0339472 A1 | 12/2013 | Ruellan | |

(Continued)

FOREIGN PATENT DOCUMENTS

WO   WO 2015/108534   7/2015

OTHER PUBLICATIONS

European Patent Office Communication pursuant to Article 94(3) EPC issued in App. No EP20181385.4, dated Jul. 18, 2022, 7 pages.

(Continued)

*Primary Examiner* — Vance M Little

(57) ABSTRACT

In one aspect, the present disclosure relates to a method including: determining whether first data representative of a first string of content used by a user to access an application is present within the data structure having positions that contain values representative of strings of content; responsive to determination that the first data is not present within the data structure, retrieving a value from an index using a key associated with the user, the value being derived from positions in the data structure that contain values representative of a second string of content previously used by the user to access the application; decrementing the values of the positions in the data structure representative of the second string of content to remove second data representative of the second string of content from the data structure; and adding the first data representative of the first string of content to the data structure.

20 Claims, 11 Drawing Sheets

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Count = 0 | Count = 0 | Count = 0 | Count = 0 | Count = 0 | Count = 0 | Count = 0 | Count = 0 | Count = 0 | Count = 0 | Count = 0 | Count = 1 | Count = 1 | Count = 2 | Count = 0 | Count = 2 |

602

Index 604

| key | value | |
|---|---|---|
| hash(user1@SaaSApp.com) | 0, 2, 3 | 604a |
| hash(user2@SaaSApp-B.com) | 0, 2, 4 | 604b |
| | | |

(56) References Cited

U.S. PATENT DOCUMENTS

| | | | |
|---|---|---|---|
| 2014/0013027 A1 | 1/2014 | Jannyavula Venkata et al. | |
| 2015/0046142 A1 | 2/2015 | Ramamoorthy et al. | |
| 2015/0206109 A1* | 7/2015 | Caldwell ............... | G06Q 20/10 705/39 |
| 2016/0253425 A1 | 9/2016 | Stoops et al. | |
| 2017/0154110 A1 | 6/2017 | Chen | |
| 2020/0250296 A1* | 8/2020 | Zhao .................... | G06F 21/577 |

OTHER PUBLICATIONS

Office Action (Final Rejection) dated Aug. 17, 2022 for U.S. Appl. No. 16/587,352 (pp. 1-39).

Office Action (Non-Final Rejection) dated Mar. 30, 2022 for U.S. Appl. No. 16/587,352 (pp. 1-52).

Office Action (Final Rejection) dated Dec. 21, 2021 for U.S. Appl. No. 16/587,352 (pp. 1-45).

U.S. Appl. No. 16/587,352, filed Sep. 30, 2019, Akar, et al.

Extended European Search Report and Written Opinion dated Nov. 24, 2020 for EP Application No. 20181385.4; 10 pages.

Guo, et al. "Theory and Network Applications of Dynamic Bloom Filters;" Downloaded from https://cis.temple.edu/~jiewu/research/publications/Publication_files/infocom2006.pdf; Apr. 2006; 12 pages.

Non Final Office Action, U.S. Appl. No. 16/587,352, dated Jul. 19, 2021, 62 pages.

\* cited by examiner

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Count = 0 | Count = 0 | Count = 0 | Count = 0 | Count = 0 | Count = 0 | Count = 0 | Count = 0 | Count = 0 | Count = 0 | Count = 0 | Count = 0 | Count = 1 | Count = 1 | Count = 0 | Count = 1 |

Index 604

| key | value |
|---|---|
| hash(user1@SaaSApp.com) | 0, 2, 3 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Count = 0 | Count = 0 | Count = 0 | Count = 0 | Count = 0 | Count = 0 | Count = 0 | Count = 0 | Count = 0 | Count = 0 | Count = 0 | Count = 1 | Count = 1 | Count = 2 | Count = 0 | Count = 2 |

Index 604

| key | value |
|---|---|
| hash(user1@SaaSApp.com) | 0, 2, 3 |
| hash(user2@SaaSApp-B.com) | 0, 2, 4 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Count = 0 | Count = 0 | Count = 0 | Count = 0 | Count = 0 | Count = 0 | Count = 0 | Count = 0 | Count = 0 | Count = 0 | Count = 0 | Count = 1 | Count = 0 | Count = 1 | Count = 0 | Count = 1 |

↙ 602

Index 604

| key | value |
|---|---|
| hash(user2@SaaSApp-B.com) | 0, 2, 4 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Count = 0 | Count = 0 | Count = 1 | Count = 0 | Count = 1 | Count = 0 | Count = 1 | Count = 0 | Count = 0 | Count = 0 | Count = 0 | Count = 1 | Count = 0 | Count = 1 | Count = 0 | Count = 1 |

↙ 602

Index 604

| key | value |
|---|---|
| hash(user2@SaaSApp-B.com) | 0, 2, 4 |
| hash(user1@SaaSApp.com) | 9, 11, 13 |

↙ 604b
↙ 604c

RESOURCE ACCESS WITH USE OF BLOOM FILTERS

BACKGROUND

Many computing resources require user credentials, such as a username and a password, to be provided and authenticated before granting access to the computing resources. For example, a user who wants to gain access to a software-as-a-service (SaaS) application may be requested to enter a username and password. If the user enters the correct username and password, then access to the SaaS application may be granted. Otherwise, access may be denied.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

It is appreciated herein that, although the use of credentials, such as usernames and passwords, may provide some level of protection before permitting an authenticated user access to a requested resource, an issue that arises with the use of passwords, and other types of secrets and codes, that serve as a security measure against unauthorized access is that they are subject to certain types of attacks. For example, malicious actors are frequently trying to gain access to user passwords and other personally identifiable information. If a malicious actor learns a user's password and then presents the password to an authentication manager that controls access to a resource, the malicious actor can gain the same access to the protected resource as the legitimate user. The malicious actor may also try to use the password against other accounts owned by the user. For example, it is also common for users to use the same account identifiers (e.g., usernames) and/or passwords for multiple different accounts. Thus, if the malicious actor has gained access to one user account, the malicious actor can often gain access to other user accounts using the same credentials. To improve security, users regularly change their credentials (e.g., passwords). However, current systems require the old passwords to be kept in order to allow a password to be changed. In addition, storage of passwords and other types of secrets and codes may also present issues in some cases as the stored passwords, secrets, and/or codes may be leaked or otherwise compromised. Embodiments of the present disclosure provide solutions to these and other technical problems described herein.

In accordance with one illustrative embodiment provided to illustrate the broader concepts, systems, and techniques described herein, a method may include, responsive to a user requesting authorization to access an application, determining, by a computing device, whether first data representative of a first string of content used to access the application is present within the data structure, the data structure having a plurality of positions that contain values representative of strings of content. The method may also include, responsive to determination that the first data representative of the first string of content is not present within the data structure, retrieving a value from an index using a key associated with the user, the value being derived from positions in the data structure that contain values representative of a second string of content previously used by the user to access the application, decrementing the values of the positions in the data structure representative of the second string of content to remove second data representative of the second string of content from the data structure, the decrementing using the value from the index rather than with use of a representation of the second string of content, and adding the first data representative of the first string of content to the data structure. The method may further include determining, by the computing device, whether the user is permitted to access another application using the data structure having the second data representative of the second string of content removed.

According to another illustrative embodiment provided to illustrate the broader concepts described herein, a system includes a memory and one or more processors in communication with the memory. The processor may be configured to, responsive to a user requesting authorization to access an application, determine whether first data representative of a first string of content used to access the application is present within the data structure, the data structure having a plurality of positions that contain values representative of strings of content. The processor may be also configured to, responsive to determination that the first data representative of the first string of content is not present within the data structure, retrieve a value from an index using a key associated with the user, the value being derived from positions in the data structure that contain values representative of a second string of content previously used by the user to access the application, decrement the values of the positions in the data structure representative of the second string of content to remove second data representative of the second string of content from the data structure, the decrement of the values using the value from the index rather than with use of a representation of the second string of content, and add the first data representative of the first string of content to the data structure. The processor may be further configured to determine whether the user is permitted to access another application using the data structure having the second data representative of the second string of content removed.

According to another illustrative embodiment provided to illustrate the broader concepts described herein, a method may include, responsive to authorization of a user to access an application, determining, by a computing device, whether first data representative of a first string of content used to access the application is present within the data structure, the data structure having a plurality of positions that contain values representative of strings of content that are present in the data structure. The method may also include, responsive to determination that the first data representative of a first string of content is not present within the data structure, retrieving a value from an index using a key associated with the user, the value being derived from positions in the data structure that contain values representative of a second string of content previously used by the user to access the application, decrementing the values of the positions in the data structure representative of the second string of content to remove second data representative of the second string of content from the data structure, adding the first data representative of the first string of content to the data structure, and deleting copies of the first string of content from memories associated with the computing device. The method may further include determining, by the computing device, whether the user is permitted to access another application using the data structure having the second data representative of the second string of content removed.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIGS. 6A-6D collectively illustrate operation of a data structure and a corresponding index in which to store and maintain credentials, in accordance with an embodiment of the present disclosure.

DETAILED DESCRIPTION

Figure 1:
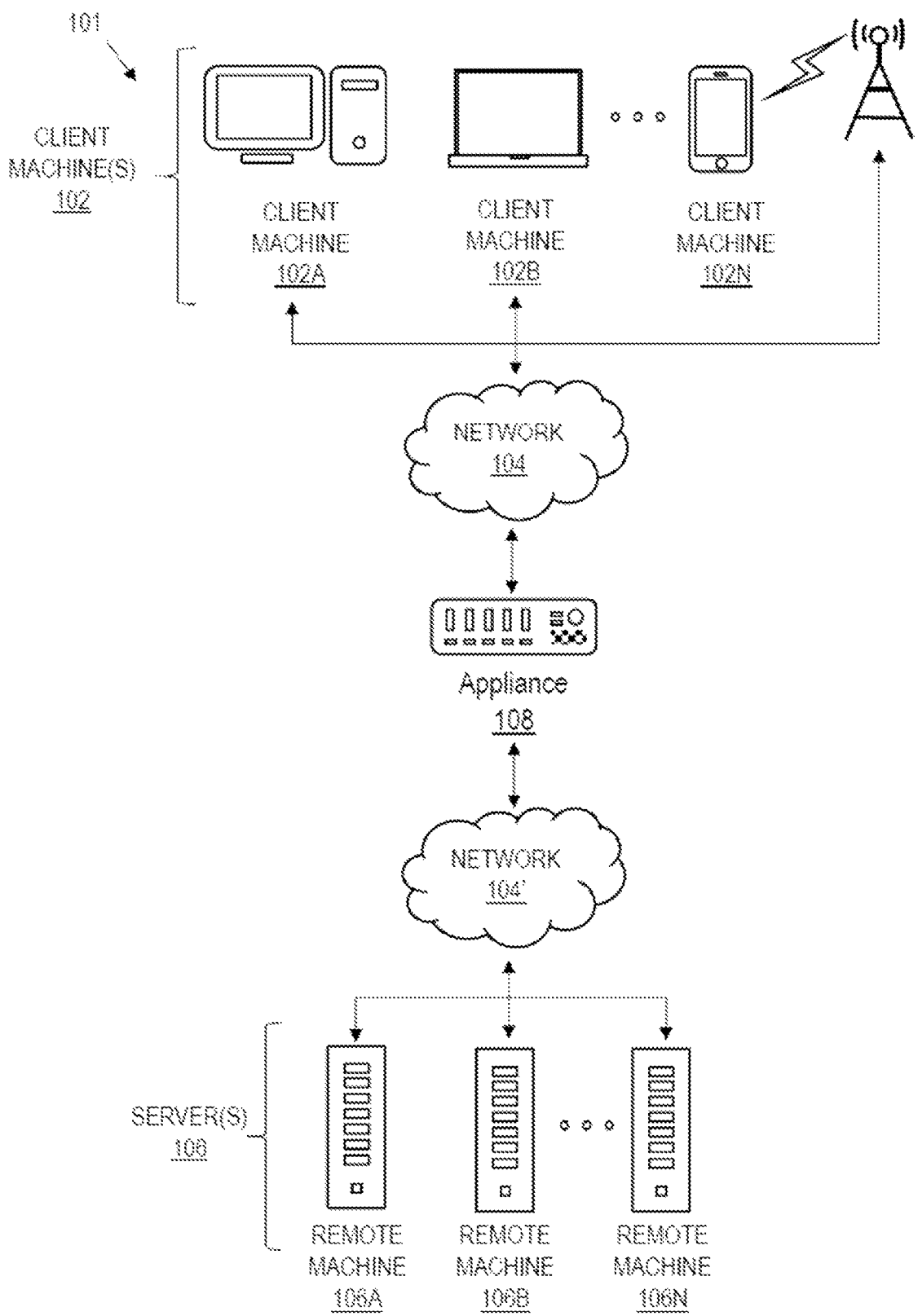
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
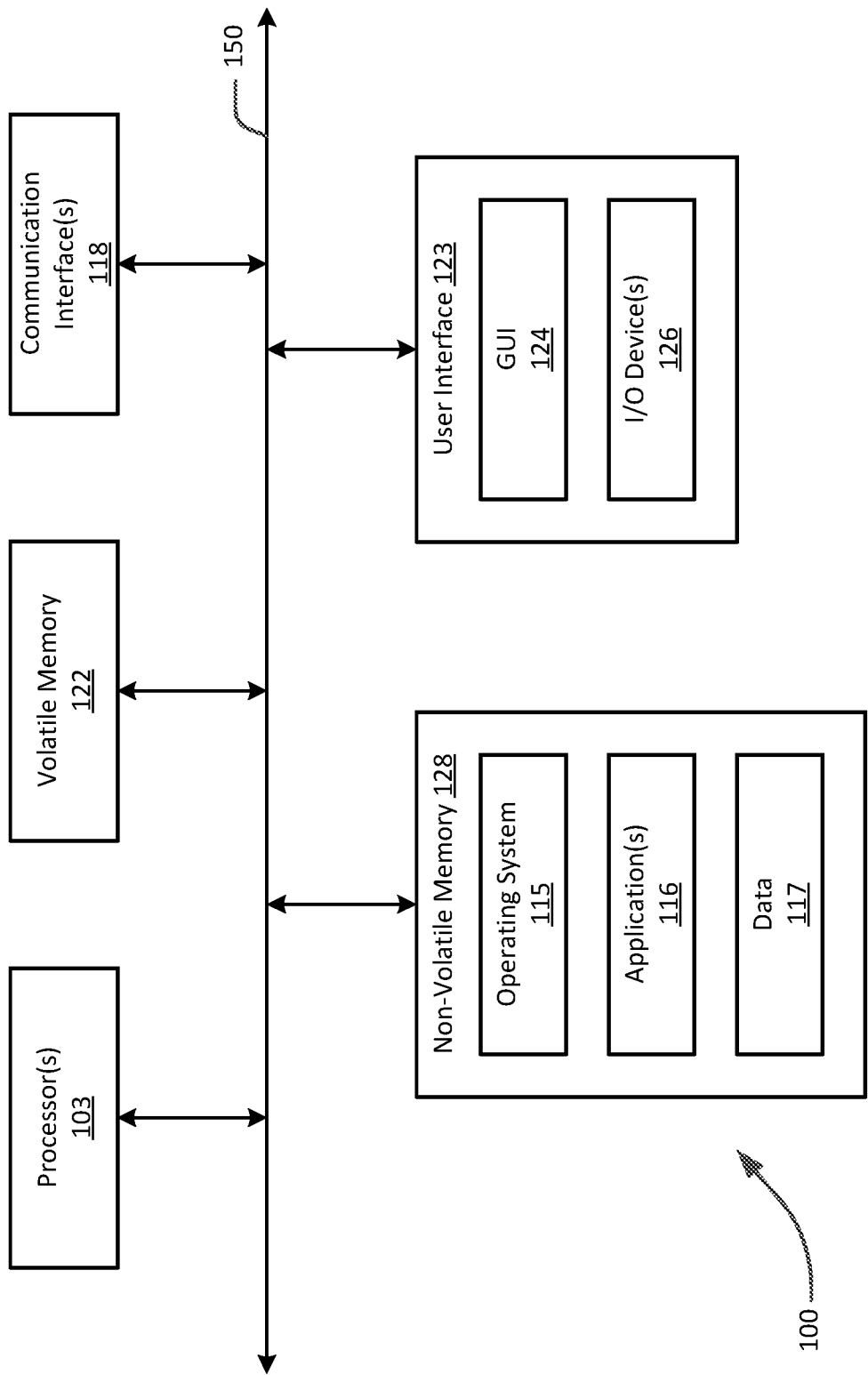
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122

(e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
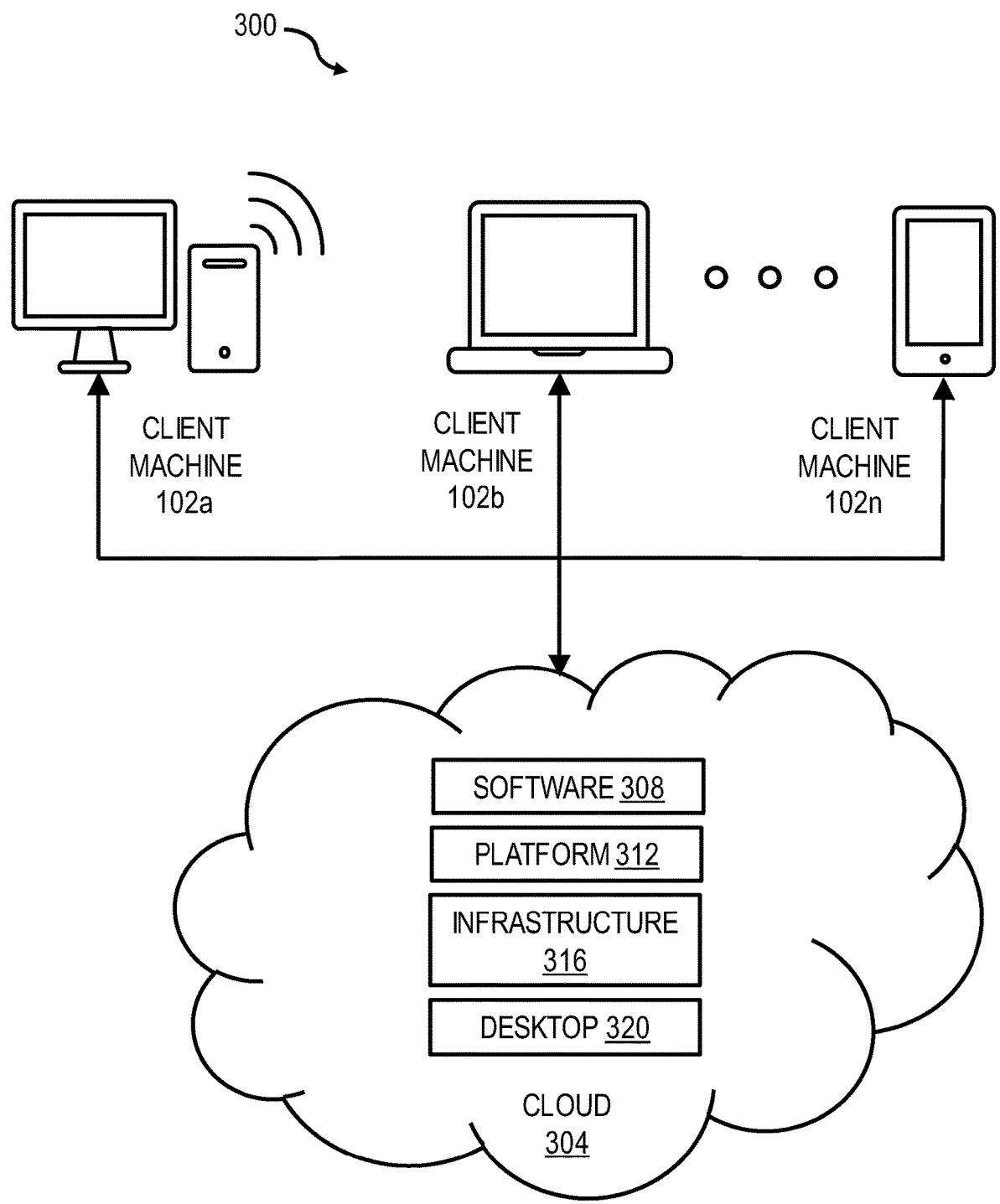
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS).

Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g., Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
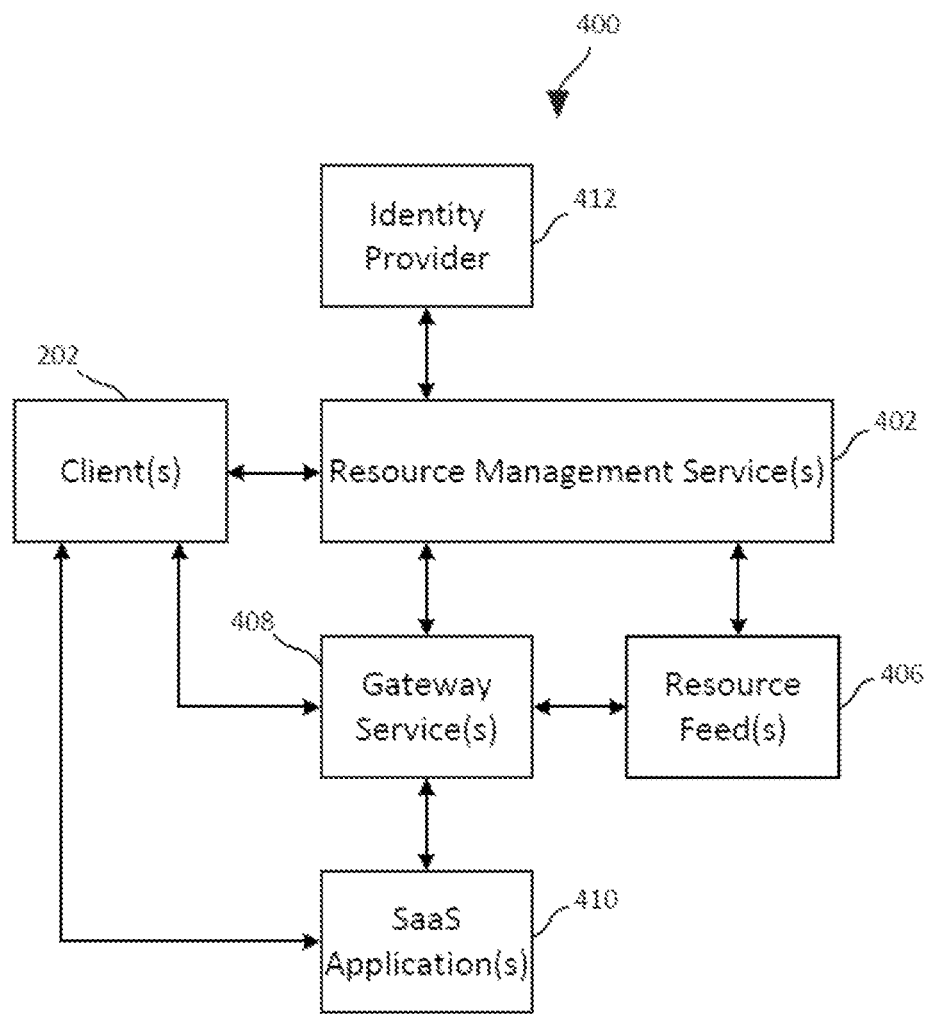
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
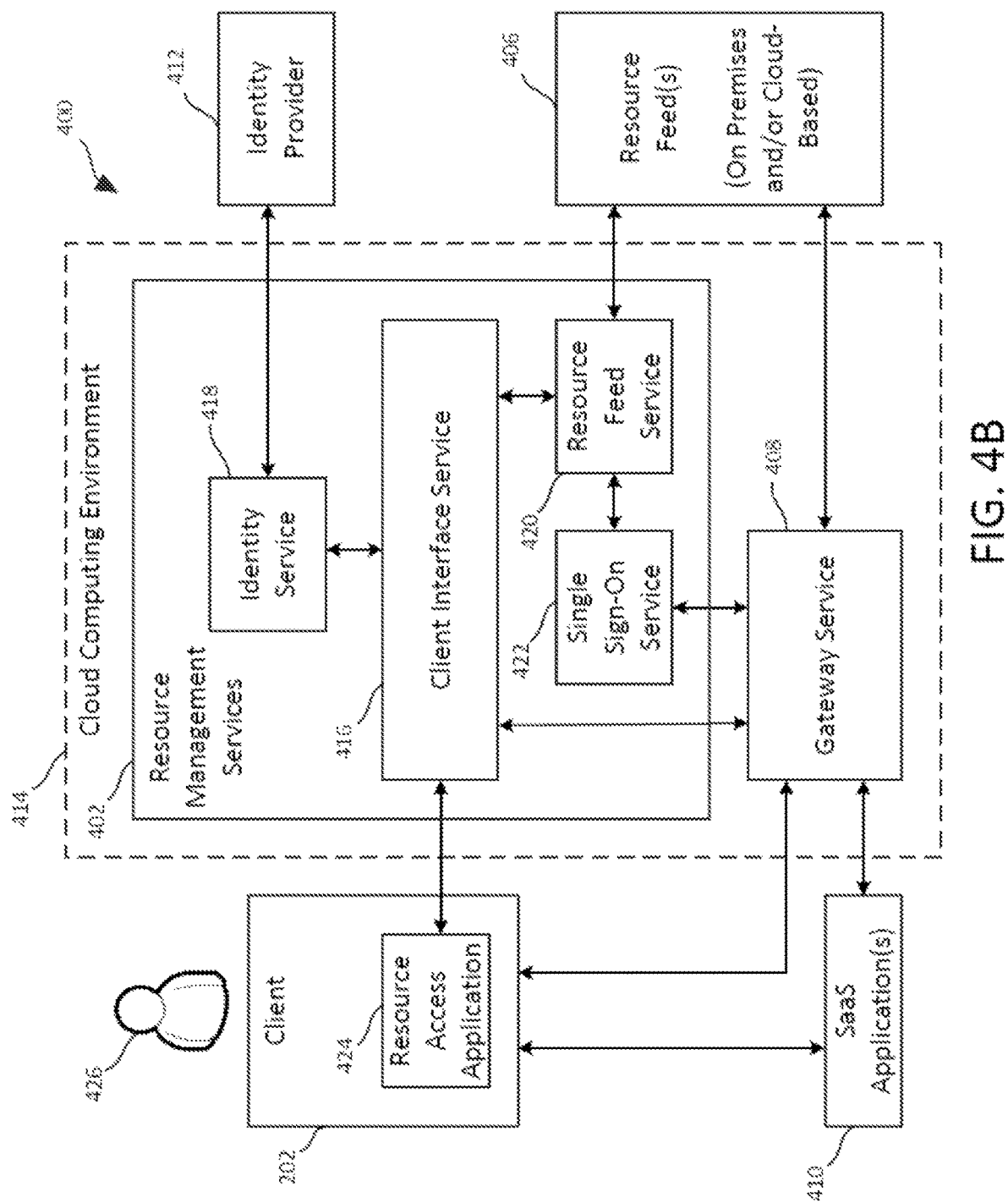
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
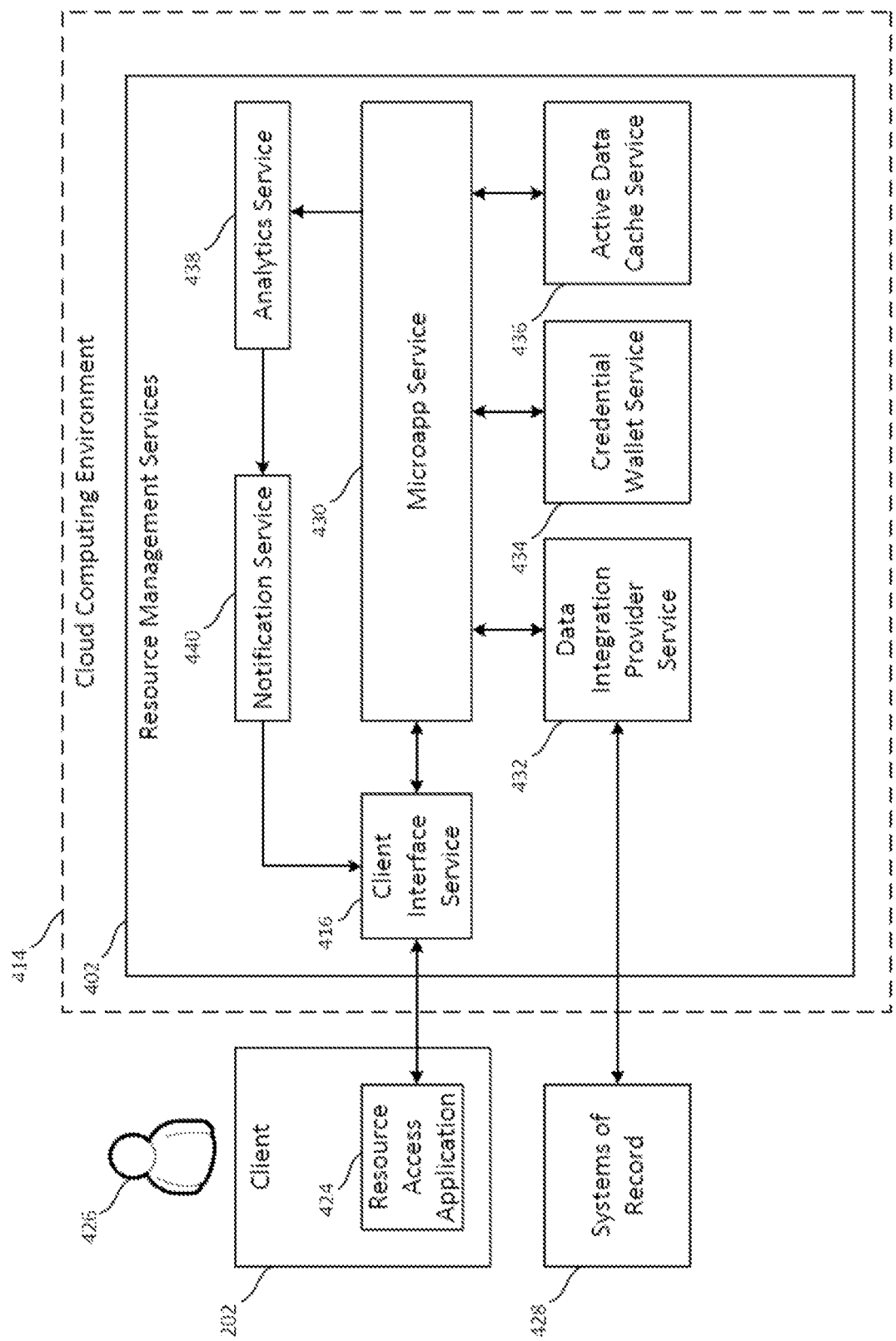
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
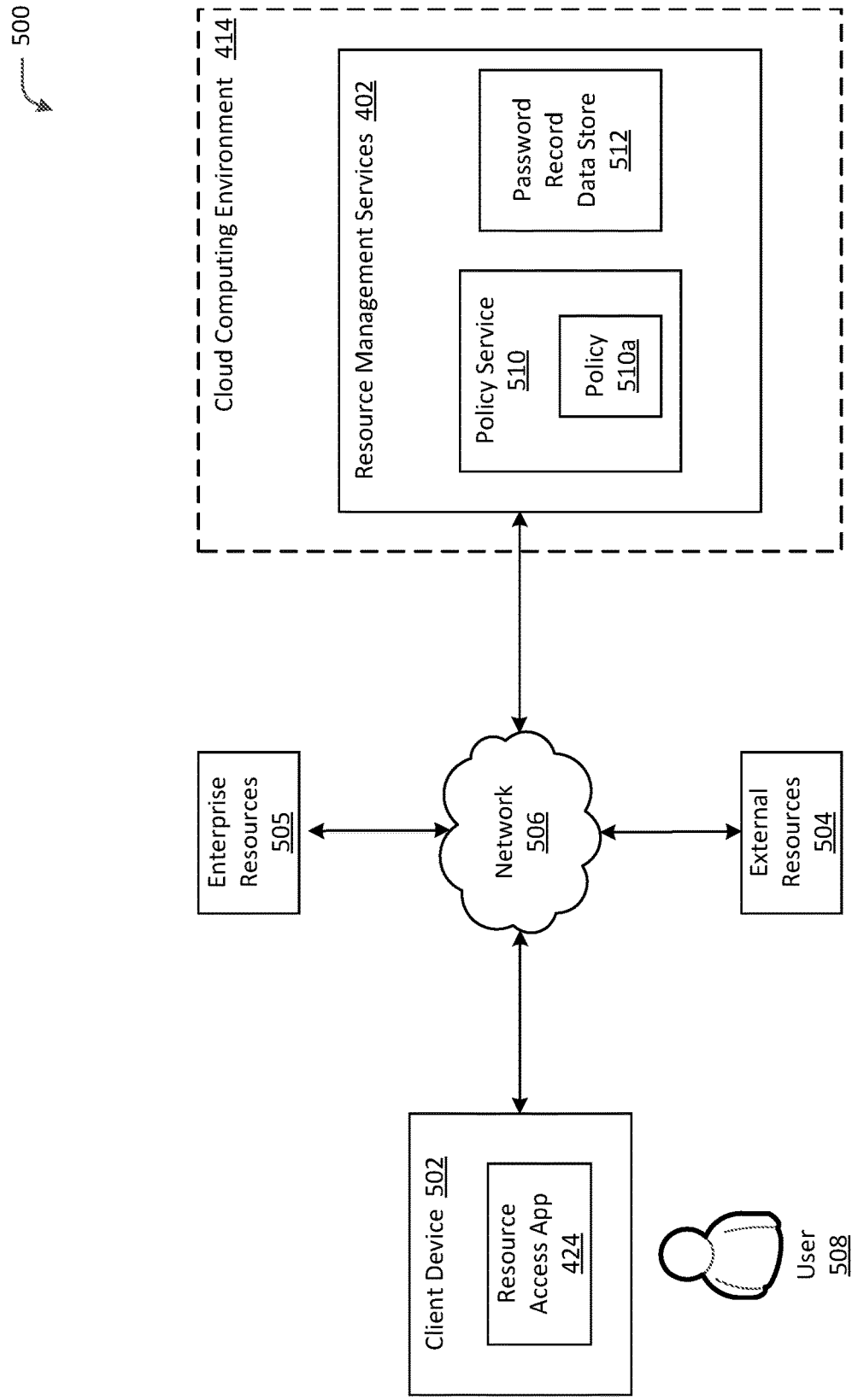
FIG. 5 is a block diagram of an illustrative network environment in which client devices can access resources with use of credentials, in accordance with an embodiment of the present disclosure.

FIG. 5 is a block diagram of an illustrative network environment 500 in which client devices can access resources with use of credentials, in accordance with an embodiment of the present disclosure. More specifically, in some embodiments, a client device can prevent corporate passwords (i.e., passwords used access resources and applications provided by an organization, sometimes referred to herein as "enterprise resources") from being used to access one or more external resources in an unauthorized fashion (i.e., resources that are distinct from the enterprise resources). This can be done without retaining copies of the corporate credentials (e.g., passwords) or other personally identifiable information (PII) (in a so-called "secure manner") using structures and techniques described herein. In FIG. 5, like elements of system 400 of FIGS. 4A-4C are shown using like reference designators. As such, the previous relevant discussion with respect to features of the like elements shown using like reference designators is equally applicable here, including the previous relevant discussion with respect to client 202, resource access application 424, resource management services 402, and cloud computing environment 414.

As shown in FIG. 5, network environment 500 can include one or more client devices 502, resource management services 402, one or more external resources 504, and one or more enterprise resources 505 communicably coupled to one another via a network 506. Network 506 may correspond one or more to wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, and Near Field Communication (NFC) networks. In some embodiments, network 506 may include another network or a portion or portions of other networks.

Network environment 500 may provide services for one or more organizations, with the organizations having one or more users associated with it. A given client device 502 may be assigned to or otherwise associated with a particular user. For example, as shown in FIG. 5, client device 502 may be assigned to, or otherwise associated with, a user 508. While only one client device 502 and one corresponding user 508 are shown in FIG. 5, the structures and techniques sought to be protected herein can be applied to any number of organizations, users, and devices.

Client device 502 can include smartphones, tablet computers, laptop computers, desktop computers, or other computing devices configured to run user applications (or "apps"). In some embodiments, client device 502 may be substantially similar to client machine 102 described above in the context of FIGS. 1 and 3, computing device 100 described above in the context of FIG. 2, and/or client 202 described above in the context of FIGS. 4A-4C.

With continued reference to, and as shown in FIG. 5, user 508 may access resource management services 402 and other services and network resources (e.g., external resources 504) using resource access application 424 installed on client device 502. Resource management services 402 may manage and streamline access to enterprise resources provided by an organization for access and use by users associated with the organization. Resource access application 424 and associated components may provide user 508 with a personalized, all-in-one interface enabling seamless access to the user's resources, such as SaaS and web applications, files, virtual Windows applications, virtual Linux applications, desktops, mobile applications, Citrix Virtual Apps and Desktops™, local applications, and other data. In one example, resource access application 424 may be the CITRIX WORKSPACE app. In an implementation, resource access application 424 may include a web browser for accessing web-based SaaS applications (e.g., external resources 504) along with other types of web apps and websites.

External resources 504 can include resources that are distinct from the enterprise resources 505 that are managed and trusted by the organization. External resources 504 are generally not under the control of the organization. In some cases, external resources 504 include applications, websites, or other resources that not managed by or otherwise associated with the user's organization. In some embodiments, external resources 504 may include any external resource that is not specifically trusted by the organization and, as such, can include illegitimate resources such as phishing websites (i.e., illegitimate websites disguised to appear similar or identical to legitimate websites).

Resource management services 402 may include a policy service 510 and a data store 512. Policy service 510 can maintain policy and other configuration information related to the one or more organizations operating in network environment 500 including security policies defined by the organizations for enforcement within network environment 500. Via policy service 510, an organization can define one or more security policies 510a related to users 508 and devices 502 associated with the organization. A security policy can specify the type of credentials (e.g., passwords) that particular users/devices and/or groups of users/devices are permitted for use with respect to the organization's applications and content. As one example, an organization may define a security policy that prohibits the reuse of corporate passwords for user authentication to non-enterprise resources (e.g., one or more external resources 504). As another example, an organization may define a security policy that prohibits the use of the previous N corporate passwords (where N is a number such as 2, 3, 4, or any other number) for user authentication to non-enterprise resources. As another example, an organization may specify in a security policy a list of the enterprise resources (e.g., URLs/domains of web sites and/or applications). Such a security policy may then be used to distinguish between enterprise resources and external resources (i.e., resources that are not listed or otherwise identified as an enterprise resource). A security policy targeting a particular user or group of users may be applicable to the device/devices assigned to the user/users.

Data store 512 can maintain a record of the corporate credentials (e.g., passwords) or other PII. In some implementations, data store 512 may include a data structure (e.g., a counting Bloom filter) and a corresponding index for maintaining the recorded corporate passwords. In such implementations, the data structure can represent the corporate credentials or PII recorded by the organization and the corresponding index can represent the positions in the data structure (e.g., positions in the counting Bloom filter) representative of each recorded piece of information.

A counting Bloom filter is a space-efficient probabilistic data structure that can be used to determine whether an element is a member of a set. Unlike a traditional Bloom filter, a counting Bloom filter provides a way to delete elements. A counting Bloom filter can be implemented using data structure, such as a data vector, where each position in the data structure can be individually addressed. In a counting Bloom filter, each position in the data structure corresponds to a counter. A counting Bloom filter is initialized by setting the value of each counter to an initial value of zero ("0"), which indicates that no elements have been added to the counting Bloom filter. There may be a number, k, of different hash functions defined for the counting Bloom filter. Given an element input to each of the k hash functions, each hash function maps (or hashes) the element to one of the positions in the data structure. In the case of a counting Bloom filter, the term "data structure" used herein can refer to both the Bloom filter itself and to the data structure on which it is implemented. The subject matter sought to be protected herein may be implemented using data structures other than counting Bloom filters.

To add a given corporate credential (e.g., a password, an authentication challenge question, and other credentials which may change) to the counting Bloom filter, the corporate credential can be input to each of the k hash functions (e.g., each of k=4 hash functions) to obtain a corresponding number, k, of positions in the data structure. The positions in the data structure obtained by hashing the corporate credential are representative of the corporate credential. The values of the counters at each of the obtained positions in the data structure can then be incremented—i.e., increased by a value of one (1)—to indicate addition of the corporate credential in the counting Bloom filter. Note that if other corporate credentials were previously added to the counting Bloom filter, then the values of the counters at some of the positions in the data structure obtained by hashing a given corporate credential may have a value other than zero (0). The positions in the data structure mapped from the hash functions due to the added corporate credential (i.e., the positions in the data structure representative of the added corporate password) can then be recorded as an entry in the index. In some implementations, each entry in the index may be stored as a key-value pair, where the positions in the data structure representative of a corporate credential may be stored as the value, and an identifier (e.g., username, user identifier, and the like) used with the corporate credential may be stored as the key. Recording the positions in the data structure representative of the added corporate credential in the index in this manner allows for later determining the positions in the data structure that correspond to the added corporate credential without having to hash the actual corporate credential using the k hash functions. Operation of the counting Bloom filter and its corresponding index will be further described below at least with respect to FIGS. 6A-6D.

To query for a given credential (e.g., a password) in the counting Bloom filter (e.g., to determine whether the given credential matches a corporate credential in the counting Bloom filter), the given credential is input to each of the k hash functions associated with the counting Bloom filter to obtain a corresponding number of positions in the data structure. If a value of one or more of the counters at these positions in the data structure is zero (0), the given credential is not in the counting Bloom filter. If the values of the counters at all of these positions in the data structure are larger than zero (0), the given credential is likely in the counting Bloom filter. In other words, there is a matching entry in the counting Bloom filter, and the given credential is likely to be a corporate credential.

To remove a corporate credential (e.g., a password) from the counting Bloom filter, the positions in the data structure representative of the corporate credential can be retrieved or otherwise determined from the index corresponding to the counting Bloom filter. For example, a specific entry in the index storing the positions in the data structure representative of the corporate credential may be identified using a key (e.g., key-value pair). The values of the counters at each of the obtained positions in the data structure can then be decremented—i.e., decreased by a value of one (1)—to remove the corporate credential from the counting Bloom filter. The entry for the removed corporate credential can then be removed (deleted) from the corresponding index. The index allows for determining the positions in the data structure representative of a corporate credential (e.g., a password) that is present in the counting Bloom filter without having actual knowledge of the corporate credential. That is, the corporate credential does not need to be hashed using the hash functions to obtain the positions in the data structure. Thus, the corporate credential or PII does not have to be stored or otherwise retained. This provides increased security in that the actual credential or PII need not be stored or maintained and, thus, not subject to leakage or loss.

As a solution to the aforementioned and other technical problems related to the use of passwords, in some embodiments, resource access application 424 may be programmed or otherwise configured to monitor navigation events to determine whether user 508 is using resource access application 424 to access an enterprise resource 505 or an external resource 504. For example, the organization may configure the URLs/domains of enterprise resources to which user 510 has access in a security policy (e.g., policy 512a). The URLs/domains that are not configured may be considered external resources. Resource access application 424 can then determine form the configured enterprise resource URLs/domains whether login is to an enterprise resource 505 or an external resource 504. In some such embodiments, if access to an enterprise resource is detected, resource access application 424 can monitor for use of authentication credentials (e.g., username and password) to login to an enterprise resource (e.g., an enterprise SaaS application). Upon login to the enterprise resource 505, resource access application 424 can intercept or otherwise receive the credential (e.g., password) that was used to login to the enterprise resource 505 and query the data structure. If the query results in a match (i.e., the credential is present in the data structure or, in the case of a counting Bloom filter, is likely present in the data structure), resource access application 424 can determine that the credential used to login to the enterprise resource is a current corporate credential.

However, if the query does not result in a match, resource access application 424 can determine that the credential (e.g., password) used to login to the enterprise resource 505 is not a current corporate credential. For example, user 508 may be logging in to the enterprise resource 505 for the first time, or user 508 may have changed the password for the enterprise resource 505. In cases where the corporate password has not been previously recorded, resource access application 424 can determine if a different (or "old") corporate credential (e.g., old password) was previously recorded for user authentication to the enterprise resource 505 (i.e., can check for an old password that may have been used with a specific username or other identifier to login to the enterprise resource). If an old corporate credential was recorded for user authentication to the enterprise resource 505, resource access application 424 can delete the record of the old corporate credential. For example, to determine whether an old corporate password was recorded for a specific username, the index corresponding to the counting Bloom filter can be checked for an entry having a key that matches the specific username used with the password. An entry in the index for the specific username is an indication that a corporate password corresponding to the specific username has been previously recorded (i.e., has been previously added to the counting Bloom filter). If the index contains an entry for the specific username, resource access application 424 can retrieve the value representing the positions in the counting Bloom filter representative of the previously recorded corporate password (i.e., the old corporate password added to the counting Bloom filter for the specific username). Resource access application 424 can then use the retrieved value from the index to remove the old corporate password for the specific username from the counting Bloom filter. Upon removing the old corporate password from the counting Bloom filter, resource access application 424 can record the password that was used to login to the enterprise resource 505 as a current password by adding the password to the counting Bloom filter. Resource access application 424 can then update the entry for the username in the corresponding index with the positions in the counting Bloom filter that are representative of the newly recorded current corporate password.

If the index does not contain an entry for the specific username, resource access application 424 can determine that a credential (e.g., a corporate password) corresponding to the specific username has not been previously recorded. In this case, resource access application 424 can record the credential (e.g., a password) that was used to login to the enterprise resource 505 as a current corporate credential (e.g., a corporate password). For example, resource access application 424 can add the password to the counting Bloom filter that is being used for recording the current corporate passwords and create an entry for the password newly added to the counting Bloom filter in the corresponding index (e.g., a username password key-value pair entry in the corresponding index).

In some embodiments, resource access application 424 may monitor navigation events to determine that user 508 is using resource access application 424 to access an external resource. In such embodiments, resource access application 424 can monitor for use of authentication credentials (e.g., username and password) to login to an external resource (e.g., an external application or website). Upon detecting an attempt to login to an external resource, resource access application 424 can note the credential(s) (e.g., a password) that was input or otherwise provided in the attempt to login to the external resource. Resource access application 424 can then use a counting Bloom filter being used for recording the credentials (e.g., current corporate passwords) of users associated with the organization to determine whether the input credential is a current corporate credential. For example, resource access application 424 can determine that the input password is a current corporate password by querying and finding a match in the counting Bloom filter. If the input password is determined to be a current corporate password, resource access application 424 can take an appropriate action to restrict the use of the input password or otherwise take steps to limit or prevent access to the resource. As one example, resource access application 424 may cause a notification to be sent to a security operations center of the organization of the detected attempt to use and/or use of a corporate password to login to an external resource. As another example, resource access application 424 may prevent the input password from being sent to the external resource or to a credential authentication service of the external resource for processing of the login request. In any case, restricting the use of a credential (e.g., a corporate password) for accessing an external resource 504 can protect against fraudulent attempts to obtain the credential via the external resource (e.g., to prevent phishing attacks).

In some embodiments, an applicable security policy may prohibit the use of the previous N (e.g., N=3) credentials (e.g., corporate passwords) for user authentication to access an external resource. To implement such a policy, an organization may utilize a corresponding number of counting Bloom filters and corresponding indexes. For example, a first counting Bloom filter and a first index may be used to record the current corporate passwords of the users associated with an organization, a second counting Bloom filter and a second index may be used to record the corporate passwords immediately preceding the current corporate passwords, and a third counting Bloom filter and a third index may be used to record the corporate passwords preceding the immediately preceding corporate passwords. Then, upon detecting an attempt to login to an external resource, resource access application 424 can use the N counting Bloom filters being used for recording the previous N corporate passwords of users associated with the organization to determine whether a password input in the attempt to login to the external resource is one of the previous N corporate passwords.

In some embodiments, an applicable security policy may require maintaining a record of the previous M (e.g., M=3) credentials (e.g., corporate passwords) of particular users associated with an organization. For example, to maintain records of the previous M corporate passwords, the organization may use a first counting Bloom filter and a first index to record the current corporate passwords of the users associated with an organization, a second counting Bloom filter and a second index to record the corporate passwords immediately preceding the current corporate passwords, and a third counting Bloom filter and a third index to record the corporate passwords preceding the immediately preceding corporate passwords. Then, upon detecting a new corporate password of a user that has not been added to any of the M counting Bloom filters as a previous corporate password of the user, resource access application 424 can remove the user's oldest previous corporate password from the third counting Bloom filter based on data (i.e., data representing positions in the counting Bloom filter representative of the oldest previous corporate password of the user) retrieved from the corresponding index, and remove the entry for the user's oldest previous corporate password from the third index.

Continuing with the above example, resource access application 424 can then determine the positions in the second Bloom filter representative of the user's next oldest previous corporate password from the second index and use the retrieved data to add the next oldest previous corporate password to the third counting Bloom filter. In such examples, for each of the retrieved positions, resource access application 424 can increment the value of the counter at a specific position in the third counting Bloom filter to add the user's next oldest previous corporate password to the third counting Bloom filter. Resource access application 424 can then add an entry in the third index for the user's next oldest previous corporate password added to the third counting Bloom filter. Removing the oldest previous corporate password from the third counting Bloom filter and adding the next oldest previous corporate password from the second counting Bloom filter to the third counting Bloom filter in this manner moves the record of the next oldest previous corporate password from the second counting Bloom filter to the third counting Bloom filter, effectively making the next oldest previous corporate password the new oldest previous corporate password. In a manner similar to that described above, resource access application 424 can move the record of the user's former current corporate password from the first counting Bloom filter to the second counting Bloom filter, and add the new corporate password to the first counting Bloom filter as the user's current corporate password. The above operations in effect maintain a record of the user's previous M corporate passwords. While the above examples contemplate maintaining a record of M corporate passwords of users, it will be appreciated in light of this disclosure that any number of previous credentials (e.g., corporate passwords) or other data or information of users may be maintained and/or restricted from use.

FIGS. 6A-6D collectively illustrate operation of a data structure 602 and a corresponding index 604 in which to store and maintain credentials, in accordance with an embodiment of the present disclosure. In the example of FIGS. 6A-6D, data structure 602 is a counting Bloom filter implemented using a 16-bit bit vector. Each position (i.e., each bit) in the bit vector may correspond to a counter. Each counter may be set to an initial value of zero ("0") to indicate that no elements (e.g., corporate passwords) have been added to counting Bloom filter 602. In this example, k=3 hash functions may be defined for hashing a corporate password that is to be added to counting Bloom filter 602. In this case, hashing a corporate password using the k=3 hash functions results in three positions in the bit vector. Index 602 may be implemented as a key-value store where a value of each entry represents the positions in the bit vector representative of a corporate password added to counting Bloom filter 602 and the corresponding key identifies the value (i.e., the positions in the bit vector representative of the corporate password added to counting Bloom filter 602). While the present example uses a counting Bloom filter 602 implemented as a 16-bit bit vector and k=3 hash functions, it will be appreciated that, in other embodiments, other types of data structures can be used to record current password usage. For example, a counting Bloom filter 602 may be implemented using a data structure other than a bit array and/or may be of a different size. As another example, a different number of hash functions may be used, e.g., k<3 or k>3 hash functions.

Referring now to FIG. 6A, a first user may login to an enterprise resource, SaaSApp.com, using a username, user1@SaaSApp.com, and a password, Password1. To record the corporate password, Password1, Password1 is input to each of the k=3 hash functions to obtain three (3) positions, 0, 2, 3, in the bit vector. Password1 is then added to counting Bloom filter 602 by incrementing the values of the counters at bit positions 0, 2, 3 in the bit vector. As can be seen in FIG. 6A, adding Password1 to counting Bloom filter 602 results in bit positions 0, 2, 3 in the bit vector having a value of one (e.g., count=1). An entry 604*a* is then added in index 604 for the Password1 that is added to counting Bloom filter 602. As can be seen in FIG. 6A, for entry 604*a*, the username used with Password1, user1@SaaSApp.com, is stored as the key, and the bit positions 0, 2, 3 are stored as the value. As shown in FIG. 6A, the value of the counter at each bit position in the bit vector and the entries in index 604 represent Password1 being the only element added to counting Bloom filter 602.

In some implementations, a hash value obtained from hashing the username using a hash function (i.e., a hash value of user1@SaaSApp.com) may be stored as the key. In some implementations, a unique salt value corresponding to user1 and/or user1 and the different domains may be stored as the key. In some implementations, the bit positions representative of Password1 may be encoded using one or more encoding functions, and the encoded value or values may be stored as the value. In such implementations, the same one or more encoding functions may be used to decode an encoded value to obtain the original bit positions.

Referring now to FIG. 6B, a second user may login to an enterprise resource, SaaSApp-B.com, using a username, user2@SaaSApp-B.com, and a password, Password2. To record the corporate password, Password2, Password2 is input to each of the k=3 hash functions to obtain three (3) positions, 0, 2, 4, in the bit vector. Password2 is then added to counting Bloom filter 602 by incrementing the values of the counters at bit positions 0, 2, 3 in the bit vector. As can be seen in FIG. 6B, adding Password2 to counting Bloom filter 602 results in bit positions 0, 2 in the bit vector having a value of two (e.g., count=2) and bit position 4 in the bit vector having a value of one (e.g., count=1). An entry 604*b* is then added in index 604 for the Password2 that is added to counting Bloom filter 602. As can be seen in FIG. 6B, for entry 604*b*, the username used with Password2, user2@SaaSApp-B.com, is stored as the key, and the bit positions 0, 2, 4 are stored as the value. As shown in FIG. 6B, the value of the counter at each bit position in the bit vector and the entries in index 604 represent Password1 and Password2 being the only elements added to counting Bloom filter 602.

Referring now to FIG. 6C, the first user may have changed the password for SaaSApp.com to Password3 and logged in to SaaSApp.com using the username, user1@SaaSApp.com, and the new password, Password3. In this case, the record of the first user's old corporate password, Password1, is deleted by removing Password1 from counting Bloom filter 602. To remove Password1 from counting Bloom filter 602, entry 604*b* in index 604 is identified using the key, user1@SaaSApp.com, and the value, 0, 2, 3, retrieved from entry 604*b*. The retrieved value, 0, 2, 3, is indicative of the positions in the bit vector that are representative of Password1. Password1 is then removed from counting Bloom filter 602 by decrementing the values of the counters at bit positions 0, 2, 3 in the bit vector. As can be seen in FIG. 6C, removing Password1 from counting Bloom filter 602 results in bit positions 0, 2 in the bit vector having a value of one (e.g., count=1) and bit position 3 in the bit vector having a value of zero (e.g., count=0). Entry 604*a*, which represented Password1 now removed from counting Bloom filter 602, is then deleted in index 604. As shown in FIG. 6C, the value of the counter at each bit position in the bit vector and the entries in index 604 represent Password2 being the only element added to counting Bloom filter 602.

With continued reference to the above example, and referring now to FIG. 6D, to record the new corporate password, Password3, Password3 is input to each of the k=3 hash functions to obtain three (3) positions, 9, 11, 13, in the bit vector. Password3 is then added to counting Bloom filter 602 by incrementing the values of the counters at bit positions 9, 11, 13 in the bit vector. As can be seen in FIG. 6D, adding Password3 to counting Bloom filter 602 results in bit positions 9, 11, 13 in the bit vector having a value of one (e.g., count=1). An entry 604*c* is then added in index 604 for the Password3 that is added to counting Bloom filter 602. As can be seen in FIG. 6D, for entry 604*c*, the username used with Password3, user1@SaaSApp.com, is stored as the key, and the bit positions 9, 11, 13 are stored as the value. As shown in FIG. 6D, the value of the counter at each bit position in the bit vector and the entries in index 604 represent Password1 and Password3 being the only elements added to counting Bloom filter 602.

Figure 7:
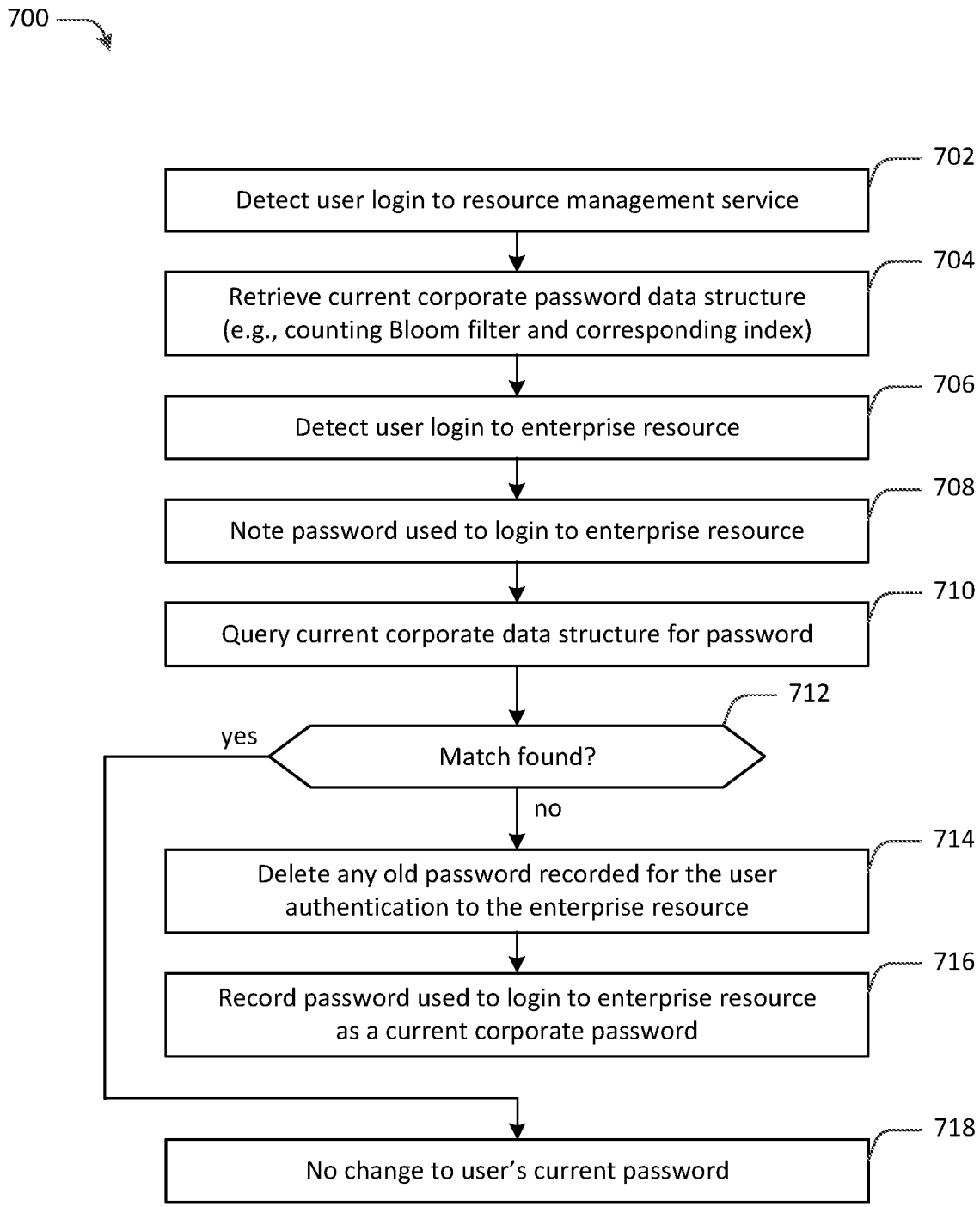
FIG. 7 is a flow diagram of an illustrative process for maintaining a record of current credential usage, in accordance with an embodiment of the present disclosure.

FIG. 7 is a flow diagram of an illustrative process 700 for maintaining a record of current credential usage (i.e., without maintain copies of the credentials), in accordance with an embodiment of the present disclosure. Example process 700, and example process 800 further described below, may be implemented or used within a computing environment or system such as those disclosed above at least with respect to FIG. 1, FIG. 2, FIG. 3, FIGS. 4A-4C and/or FIG. 5. For example, in some embodiments, the operations, functions, or actions illustrated in example process 700, and example process 800 further described below, may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102*a*-102*n* of FIG. 3, clients 202 of FIGS. 4A-4C, and/or client device 502 of FIG. 5). For example, the operations, functions, or actions described in the respective blocks of example process 700, and example process 800 further described below, may be implemented by applications 116 and/or data 117 of computing device 100.

With reference to process 700 of FIG. 7, a user, such as user 508, may execute resource access application 424 on client device 502. At 702, resource access application 424 may detect a login to resource management services 402. For example, user 508 may use resource access application 424 executing on client device 502 to login to resource management services 402. Upon successful login to resource management services 424, at 704, resource access application 424 may retrieve a current corporate password data structure, such as, for example, counting Bloom filter 602 and index 604 of FIGS. 6A-6D. For example, counting Bloom filter 602 and index 604 may be retrieved from resource management services 402 or another backend service. Counting Bloom filter 602 and index 604 may represent the current corporate passwords that have been recorded. In an implementation, resource access application 424 may retrieve the data that represents the user's (user 508) corporate passwords (e.g., the user's salts from index 604).

At 706, resource access application 424 may detect a user login to an enterprise resource. For example, user 508 may use resource access application 424 and login to a corporate application SaaSApp.com using a username, userA@SaaSApp.com, and a password, userA@password. At 708, resource access application 424 may note the password, userA@password, that was used to login to the enterprise resource. Here, the noted password, userA@password, was used for user authentication of user 508 (i.e., userA@SaaSApp.com) to access the enterprise resource. At 710, resource access application 424 may query counting Bloom filter 602 for the password, userA@password, that was input by user 508 to login to the enterprise resource.

If, at 712, resource access application 424 determines that a match is not found in counting Bloom filter 602 for the password, userA@password, then at 714, resource access application 424 may determine that the password, userA@password, is a corporate password that has not been recorded. In this case, resource access application 424 may delete any old password that may have been recorded for user 508 authentication to the enterprise resource (i.e., userA@SaaSApp.com). For example, resource access application 424 may check index 604 for an entry for userA@SaaSApp.com to determine whether an old password was previously recorded. If an old password was recorded, resource access application 424 may use data from index 604 (e.g., positions in counting Bloom filter 602 representative of the old password) to remove the old password from counting Bloom filter 602 (i.e., the current corporate password data structure) and delete the entry userA@SaaSApp.com in index 604, as previously described herein.

At 716, resource access application 424 may record of the password, userA@password, that was input by user 508 to login to the enterprise resource as a current corporate password. For example, resource access application 424 may record the password, userA@password, as a current corporate password of user 508 by adding the password, userA@password, to counting Bloom filter 602 and adding an entry (e.g., a unique salt) in index 604 for the newly recorded corporate password, userA@password, as previously described herein.

Otherwise, if, at 712, resource access application 424 determines that a match is found in counting Bloom filter 602 for the password, userA@password, then at 718, resource access application 424 may determine that the password, userA@password, is a current corporate password that has already been recorded. In this case, resource access application 424 may conclude that the previously recorded current corporate password has not been changed.

In some embodiments, resource access application 424 may determine from the passwords recorded in counting Bloom filter 602 that user 508 is using a credential (e.g., a password) for a first enterprise resource (e.g., enterprise application) that is the same credential that is being used for a second enterprise resource. In this case, resource access application 424 may notify user 508 that the credential for the first enterprise resource is the same as that being used for another enterprise resource, and that this credential should be changed. Resource access application 424 may also prohibit access to the first enterprise resource until the credential is changed.

Figure 8:
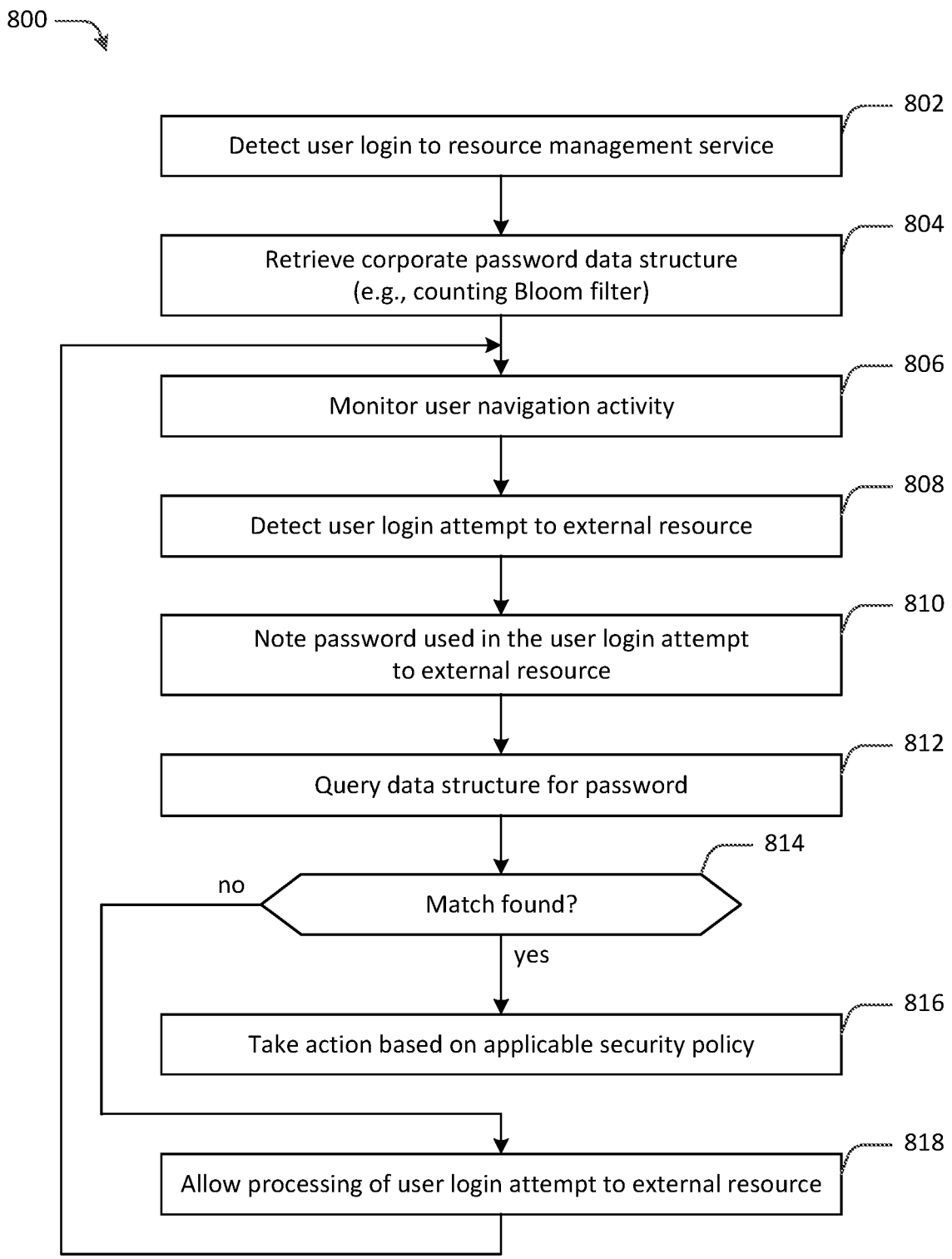
FIG. 8 is a flow diagram of an illustrative process for usage of credentials across applications, in accordance with an embodiment of the present disclosure.

FIG. 8 is a flow diagram of an illustrative process 800 for usage of credentials across applications, in accordance with an embodiment of the present disclosure. With reference to process 800, a user, such as user 508, may execute resource access application 424 on client device 502. At 802, resource access application 424 may detect a login to resource management services 402. For example, user 508 may use resource access application 424 executing on client device 502 to login to resource management services 402. Upon successful login to resource management services 424, at 804, resource access application 424 may retrieve a data structure, such as, for example, counting Bloom filter 602 of FIGS. 6A-6D. For example, counting Bloom filter 602 may be retrieved from resource management services 402 or another backend service. Counting Bloom filter 602 may represent the credentials (e.g., corporate passwords) or other data and/or information about a user that have been recorded.

At 806, resource access application 424 may monitor user navigation activity. For example, resource access application 424 may monitor navigation events and determine whether the navigation is to enterprise resources or external resources. At 808, resource access application 424 may detect a user login attempt to an external resource. For example, user 508 may use resource access application 424 and attempt to login to an external application PersonalApp.com using a username, user@PersonalApp.com, and a password, user@passwordABC.

At 810, resource access application 424 may note the credentials (e.g., the password, user@passwordABC), that was used in the user login attempt to the external resource. At 812, resource access application 424 may query counting Bloom filter 602 for the credentials (e.g., the password, user@passwordABC), that was input by user 508 in the attempt to login to the external resource.

If, at 814, resource access application 424 determines that a match is found in counting Bloom filter 602 for the password, user@passwordABC, then at 816, resource access application 424 may determine that the password, user@passwordABC, is likely to be a corporate password that has been recorded. In this case, resource access application 424 may take one or more actions based on an applicable security policy. For example, the applicable security policy may specify that resource access application 424 send or otherwise provide to a security operations center of the organization a notification of the detected attempt to use the password, user@passwordABC, for user authentication to an external resource. Additionally or alternatively, the applicable security policy may specify that resource access application 424 prevent further processing of the user login attempt to the external resource. For example, resource access application 424 may prevent the input password, user@passwordABC, from being sent to the external resource or to a credential authentication service of the external resource. As another example, resource access application 424 may check a reputation score of the external resource and prevent the input password, user@passwordABC, from being sent to the external resource or to a credential authentication service of the external resource if the reputation score does not satisfy a predetermined threshold. Application of such a security policy may prevent the input password, which has been determined to likely be a corporate password, from being used on an external resource and possibly being subjected to an attack.

Otherwise, if, at 814, resource access application 424 determines that a match is not found in counting Bloom filter 602 for the password, user@password, then at 818, resource access application 424 may determine that the password, user@passwordABC, is definitely not a corporate password that has been recorded. In this case, resource access application 424 may allow processing of the user login attempt to the external resource.

In some embodiments, an applicable security policy may allow a predetermined number, C (e.g., C=3), of user authorizations using a credential that is a recorded corporate credential before prohibiting the use of the credential. In such embodiments, resource access application 424 may decrement a counter each time the credential is used for user authentication on either an enterprise resource or an external resource. Then, upon determining that the predetermined number of user authentications have been utilized, resource access application 424 may take an appropriate action to restrict the use of the credential. For example, resource access application 424 may prevent the login attempt until the credential is changed or otherwise updated to be different than the recorded corporate credential.

In some embodiments, the organization may define a security policy that is applicable to a specified class of resources. Nonlimiting examples of classes of resources include financial resources (e.g., banking application), project management resources, entertainment resources, and enterprise infrastructure resources, to name a few examples. For example, the organization may define a security policy that prohibits the reuse of corporate credentials that are used by users to access financial resources. In such embodiments, resource access application 424 may monitor for login to an enterprise resource or an external resource and determine whether a credential that was input or otherwise provided to login to the resource is a corporate credential used for accessing financial resources. If so, resource access application 424 may apply the applicable security policy (e.g., restrict the use of the credential).

In some embodiments, the organization may define different security policies based on whether the recorded corporate credential is used for user authentication to an enterprise resource to which multi-factor authentication (MFA) is also applied. For example, an organization may define a first security policy that prohibits the reuse of corporate credentials that are used for user authentication to enterprise resources to which MFA is not being applied, and a second, less-restrictive security policy that allows limited reuse of corporate credentials that are used for user authentication to enterprise resources to which MFA is being applied.

Further Example Embodiments

The following examples pertain to further embodiments, from which numerous permutations and configurations will be apparent.

Example 1 includes a method including: responsive to a user requesting authorization to access an application, determining, by a computing device, whether first data representative of a first string of content used to access the application is present within the data structure, the data structure having a plurality of positions that contain values representative of strings of content; responsive to determination that the first data representative of the first string of content is not present within the data structure, retrieving a value from an index using a key associated with the user, the value being derived from positions in the data structure that contain values representative of a second string of content previously used by the user to access the application; decrementing the values of the positions in the data structure representative of the second string of content to remove second data representative of the second string of content from the data structure, the decrementing using the value from the index rather than with use of a representation of the second string of content; and adding the first data representative of the first string of content to the data structure; and determining, by the computing device, whether the user is permitted to access another application using the data structure having the second data representative of the second string of content removed.

Example 2 includes the subject matter of Example 1, wherein the determining whether the user is permitted to access the another application includes determining that the user is not permitted to access the another application using the first string of content used to access the application.

Example 3 includes the subject matter of any of Examples 1 and 2, wherein the determining whether the user is permitted to access the another application includes determining that the user is not permitted to access the another application using a third string of content previously used by the user to access the application.

Example 4 includes the subject matter of any of Examples 1 through 3, wherein the data structure is a counting Bloom filter.

Example 5 includes the subject matter of any of Examples 1 through 4, wherein the positions in the data structure representative of the second string of content are determined by application of one or more hash functions to the second string of content.

Example 6 includes the subject matter of any of Examples 1 through 5, wherein the first string of content and the second string of content are passwords for accessing the application.

Example 7 includes the subject matter of any of Examples 1 through 6, wherein the values of the positions in the data structure are counter values.

Example 8 includes the subject matter of any of Examples 1 through 7, wherein the value from the index is determined using an encoding function.

Example 9 includes the subject matter of any of Examples 1 through 8, wherein the key associated with the user is a hash value.

Example 10 includes the subject matter of any of Examples 1 through 10, wherein adding the first data representative of the first string of content to the data structure includes: determining positions in the data structure representative of the first string of content; incrementing the values of the positions in the data structure representative of the first string of content to add the first data representative of the first string of content to the data structure; and modifying the index of the user to include a key and a value assigned to the first string of content, the value being derived from positions in the data structure that contain values representative of the first string of content.

Example 11 includes a system including a memory and one or more processors in communication with the memory and configured to: responsive to a user requesting authorization to access an application, determine whether first data representative of a first string of content used to access the application is present within the data structure, the data structure having a plurality of positions that contain values representative of strings of content; and, responsive to determination that the first data representative of the first string of content is not present within the data structure, retrieve a value from an index using a key associated with the user, the value being derived from positions in the data structure that contain values representative of a second string of content previously used by the user to access the application; decrement the values of the positions in the data structure representative of the second string of content to remove second data representative of the second string of content from the data structure, the decrement of the values using the value from the index rather than with use of a representation of the second string of content; and add the first data representative of the first string of content to the data structure; and determine whether the user is permitted to access another application using the data structure having the second data representative of the second string of content removed.

Example 12 includes the subject matter of Example 11, wherein to determine whether the user is permitted to access the another application includes to determine that the user is not permitted to access the another application using the first string of content used to access the application.

Example 13 includes the subject matter of any of Examples 11 and 12, wherein to determine whether the user is permitted to access the another application includes to determine that the user is not permitted to access the another application using a third string of content previously used by the user to access the application.

Example 14 includes the subject matter of any of Examples 11 through 13, wherein the data structure is a counting Bloom filter.

Example 15 includes the subject matter of any of Examples 11 through 14, wherein the positions in the data structure representative of the second string of content are determined by application of one or more hash functions to the second string of content.

Example 16 includes the subject matter of any of Examples 11 through 15, wherein the first string of content and the second string of content are passwords for accessing the application.

Example 17 includes the subject matter of any of Examples 11 through 16, wherein the values of the positions in the data structure are counter values.

Example 18 includes the subject matter of any of Examples 11 through 17, wherein the value from the index is determined using an encoding function.

Example 19 includes the subject matter of any of Examples 11 through 18, wherein the key associated with the user is a hash value.

Example 20 includes the subject matter of any of Examples 11 through 19, wherein to add the first data representative of the first string of content to the data structure includes: determine positions in the data structure representative of the first string of content; increment the values of the positions in the data structure representative of the first string of content to add the first data representative of the first string of content to the data structure; and modify the index of the user to include a key and a value assigned to the first string of content, the value being derived from positions in the data structure that contain values representative of the first string of content.

Example 21 includes a method including: responsive to authorization of a user to access an application, determining, by a computing device, whether first data representative of a first string of content used to access the application is present within the data structure, the data structure having a plurality of positions that contain values representative of strings of content that are present in the data structure; and, responsive to determination that the first data representative of a first string of content is not present within the data structure, retrieving a value from an index using a key associated with the user, the value being derived from positions in the data structure that contain values representative of a second string of content previously used by the user to access the application; decrementing the values of the positions in the data structure representative of the second string of content to remove second data representative of the second string of content from the data structure; adding the first data representative of the first string of content to the data structure; and deleting copies of the first string of content from memories associated with the computing device; and determining, by the computing device, whether the user is permitted to access another application using the data structure having the second data representative of the second string of content removed.

Example 22 includes the subject matter of Example 21, wherein the determining whether the user is permitted to access the another application includes determining that the user is not permitted to access the another application using the first string of content used to access the application.

Example 23 includes the subject matter of any of Examples 21 and 22, wherein the determining whether the user is permitted to access the another application includes determining that the user is not permitted to access the another application using a third string of content previously used by the user to access the application.

Example 24 includes a system including a memory and one or more processors in communication with the memory and configured to: responsive to authorization of a user to access an application, determine whether first data representative of a first string of content used to access the application is present within the data structure, the data structure having a plurality of positions that contain values representative of strings of content that are present in the data structure; and, responsive to determination that the first data representative of a first string of content is not present within the data structure, retrieve a value from an index using a key associated with the user, the value being derived from positions in the data structure that contain values representative of a second string of content previously used by the user to access the application; decrement the values of the positions in the data structure representative of the second string of content to remove second data representative of the second string of content from the data structure; add the first data representative of the first string of content to the data structure; and delete copies of the first string of content from memories associated with the computing device; and determine whether the user is permitted to access another application using the data structure having the second data representative of the second string of content removed.

Example 25 includes the subject matter of Example 24, wherein to determine whether the user is permitted to access the another application includes to determine that the user is not permitted to access the another application using the first string of content used to access the application.

Example 26 includes the subject matter of any of Examples 24 and 25, wherein to determine whether the user is permitted to access the another application includes to determine that the user is not permitted to access the another application using a third string of content previously used by the user to access the application.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modules executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
    responsive to a user requesting authorization to access an application, determining, by a computing device, whether first data representative of a first string of content used to access the application is present within the data structure, the data structure having a plurality of positions that contain values representative of strings of content;
    responsive to determination that the first data representative of the first string of content is not present within the data structure,
        retrieving a value from an index using a key associated with the user, the value being derived from positions in the data structure that contain values representative of a second string of content previously used by the user to access the application;
        decrementing the values of the positions in the data structure representative of the second string of content to remove second data representative of the second string of content from the data structure, the decrementing using the value from the index rather than with use of a representation of the second string of content; and
        adding the first data representative of the first string of content to the data structure; and
    determining, by the computing device, whether the user is permitted to access another application using the data structure having the second data representative of the second string of content removed.

2. The method of claim 1, wherein the determining whether the user is permitted to access the another application includes determining that the user is not permitted to access the another application using the first string of content used to access the application.

3. The method of claim 1, wherein the determining whether the user is permitted to access the another application includes determining that the user is not permitted to access the another application using a third string of content previously used by the user to access the application.

4. The method of claim 1, wherein the data structure is a counting Bloom filter.

5. The method of claim 1, wherein the positions in the data structure representative of the second string of content are determined by application of one or more hash functions to the second string of content.

6. The method of claim 1, wherein the first string of content and the second string of content are passwords for accessing the application.

7. The method of claim 1, wherein the values of the positions in the data structure are counter values.

8. The method of claim 1, wherein the value from the index is determined using an encoding function.

9. The method of claim 1, wherein the key associated with the user is a hash value.

10. The method of claim 1, wherein adding the first data representative of the first string of content to the data structure comprises:
   determining positions in the data structure representative of the first string of content;
   incrementing the values of the positions in the data structure representative of the first string of content to add the first data representative of the first string of content to the data structure; and
   modifying the index of the user to include a key and a value assigned to the first string of content, the value being derived from positions in the data structure that contain values representative of the first string of content.

11. A system comprising:
   a memory; and
   one or more processors in communication with the memory and configured to,
      responsive to a user requesting authorization to access an application, determine whether first data representative of a first string of content used to access the application is present within the data structure, the data structure having a plurality of positions that contain values representative of strings of content;
      responsive to determination that the first data representative of the first string of content is not present within the data structure,
         retrieve a value from an index using a key associated with the user, the value being derived from positions in the data structure that contain values representative of a second string of content previously used by the user to access the application;
         decrement the values of the positions in the data structure representative of the second string of content to remove second data representative of the second string of content from the data structure, the decrement of the values using the value from the index rather than with use of a representation of the second string of content; and
         add the first data representative of the first string of content to the data structure; and
      determine whether the user is permitted to access another application using the data structure having the second data representative of the second string of content removed.

12. The system of claim 11, wherein to determine whether the user is permitted to access the another application includes to determine that the user is not permitted to access the another application using the first string of content used to access the application.

13. The system of claim 11, wherein to determine whether the user is permitted to access the another application includes to determine that the user is not permitted to access the another application using a third string of content previously used by the user to access the application.

14. The system of claim 11, wherein the data structure is a counting Bloom filter.

15. The system of claim 11, wherein the positions in the data structure representative of the second string of content are determined by application of one or more hash functions to the second string of content.

16. The system of claim 11, wherein the values of the positions in the data structure are counter values.

17. The system of claim 11, wherein to add the first data representative of the first string of content to the data structure comprises:
   determine positions in the data structure representative of the first string of content;
   increment the values of the positions in the data structure representative of the first string of content to add the first data representative of the first string of content to the data structure; and
   modify the index of the user to include a key and a value assigned to the first string of content, the value being derived from positions in the data structure that contain values representative of the first string of content.

18. A method comprising:
   responsive to authorization of a user to access an application, determining, by a computing device, whether first data representative of a first string of content used to access the application is present within the data structure, the data structure having a plurality of positions that contain values representative of strings of content that are present in the data structure;
   responsive to determination that the first data representative of a first string of content is not present within the data structure,
      retrieving a value from an index using a key associated with the user, the value being derived from positions in the data structure that contain values representative of a second string of content previously used by the user to access the application;
      decrementing the values of the positions in the data structure representative of the second string of content to remove second data representative of the second string of content from the data structure;
      adding the first data representative of the first string of content to the data structure; and
      deleting copies of the first string of content from memories associated with the computing device; and
   determining, by the computing device, whether the user is permitted to access another application using the data structure having the second data representative of the second string of content removed.

19. The method of claim 18, wherein the determining whether the user is permitted to access the another application includes determining that the user is not permitted to access the another application using the first string of content used to access the application.

20. The method of claim 18, wherein the determining whether the user is permitted to access the another application includes determining that the user is not permitted to access the another application using a third string of content previously used by the user to access the application.

* * * * *